US012228800B2

(12) United States Patent  
Williams (10) Patent No.: US 12,228,800 B2
(45) Date of Patent: Feb. 18, 2025

(54) UNIVERSAL CAM ACTION HINGE AND FASTENER WITH DETENT (71) Applicant: FGX International Inc., Smithfield, RI (US)

(72) Inventor: Roy Kenneth Williams, Vancouver (CA)

(73) Assignee: FGX International Inc, Smithfield, RI (US)

( * ) Notice: Subject to any disclaimer, the term of this patent is extended or adjusted under 35 U.S.C. 154(b) by 265 days.

(21) Appl. No.: 17/484,244

(22) Filed: Sep. 24, 2021

(65) Prior Publication Data

US 2022/0091435 A1 Mar. 24, 2022

Related U.S. Application Data (60) Provisional application No. 63/082,658, filed on Sep. 24, 2020.

(51) Int. Cl.
*G02C 5/22* (2006.01)
*E05D 7/10* (2006.01)

(52) U.S. Cl.
CPC .......... *G02C 5/2209* (2013.01); *E05D 7/1061* (2013.01); *G02C 2200/08* (2013.01)

(58) Field of Classification Search
CPC ....... E05D 7/10; E05D 7/1061; E05D 7/1066; E05D 7/1072; G02C 5/2209
USPC .......................................... 16/254, 262, 266
See application file for complete search history.

(56) References Cited

U.S. PATENT DOCUMENTS

| | | | | |
|---|---|---|---|---|
| 793,023 A | * | 6/1905 | Paquette | E05D 7/1066 16/267 |
| 1,001,141 A | * | 8/1911 | Grosskopf | E05D 7/1066 59/93 |
| 1,602,754 A | * | 10/1926 | Delbridge | E05D 5/062 16/266 |
| 3,333,726 A | * | 8/1967 | Belanger | E05D 7/1072 16/257 |
| 3,416,185 A | * | 12/1968 | Peterson | E05D 7/1072 27/16 |
| 3,538,539 A | * | 11/1970 | Dale | E05D 5/14 16/375 |
| 3,610,460 A | * | 10/1971 | Siklos | E05D 7/1072 220/315 |
| 3,788,689 A | * | 1/1974 | Lloyd | E05C 19/006 292/241 |
| 3,942,647 A | | 3/1976 | Crosslen | |
| 4,153,347 A | * | 5/1979 | Myer | G02C 1/08 16/259 |
| 4,695,140 A | | 9/1987 | Bononi | |
| D315,995 S | | 4/1991 | Miller | |

(Continued)

FOREIGN PATENT DOCUMENTS

EP 2783255 1/2018

*Primary Examiner* — Emily M Morgan
(74) *Attorney, Agent, or Firm* — MALLOY & MALLOY, PL (57) ABSTRACT An inventive hinge and fastener design includes a male connector having a plurality of lobes protruding from a pin, as well as a female connector having a plurality of indentations to accommodate the lobes. The male connector may also have an arm that rotates through a channel on the female connector and can be secured within the channel via retention teeth that protrude into the channel.

11 Claims, 6 Drawing Sheets

(56) References Cited

U.S. PATENT DOCUMENTS

| | | |
|---|---|---|
| D329,552 S | 9/1992 | Wells et al. |
| 5,418,581 A * | 5/1995 | Conway .................. G02C 5/2209 |
| | | 351/116 |
| D369,485 S | 5/1996 | Lechleiter et al. |
| 5,562,208 A * | 10/1996 | Hasler ...................... B25F 1/00 |
| | | 206/373 |
| 6,338,181 B1 * | 1/2002 | Hwang ................ B65D 21/022 |
| | | 16/386 |
| D687,183 S | 7/2013 | Davis et al. |
| D699,988 S | 2/2014 | Hawkins |
| D831,391 S | 10/2018 | Grupenhof |
| D856,716 S | 8/2019 | Music et al. |
| D857,427 S | 8/2019 | Bird |
| 10,738,520 B2 * | 8/2020 | Cherry .................... E05D 11/06 |
| D901,947 S | 11/2020 | Music et al. |
| D935,811 S | 11/2021 | Dziura |
| D972,407 S | 12/2022 | Coon et al. |
| D1,002,248 S | 10/2023 | Anderson et al. |
| 11,794,975 B2 | 10/2023 | Coon |
| D1,005,842 S | 11/2023 | Coon et al. |
| 2006/0026795 A1 * | 2/2006 | Tonelli .................... E05D 7/105 |
| | | 16/221 |
| 2007/0220708 A1 * | 9/2007 | Lewis ................... E05D 11/105 |
| | | 16/334 |
| 2009/0051867 A1 | 2/2009 | Mikame |
| 2009/0280971 A1 * | 11/2009 | Kunz .................... E05D 15/505 |
| | | 483/3 |
| 2012/0062832 A1 | 3/2012 | Stanley |
| 2012/0206690 A1 | 8/2012 | Chen |
| 2014/0173852 A1 * | 6/2014 | Heninger ................. E05D 5/14 |
| | | 16/375 |
| 2017/0184873 A1 | 6/2017 | Rong et al. |
| 2018/0371813 A1 * | 12/2018 | Cherry .................... E05D 11/06 |
| 2021/0196085 A1 * | 7/2021 | Placencia ............ E05D 11/0054 |

* cited by examiner

FIG. 10

UNIVERSAL CAM ACTION HINGE AND FASTENER WITH DETENT

CLAIM OF PRIORITY

The present Non-Provisional patent application claims priority pursuant to 35 U.S.C. Section 119(e) to a currently and prior filed Provisional patent application, namely, that having Ser. No. 63/082,658 filed on Sep. 24, 2020, the contents of which is incorporated herein by reference in its entirety.

BACKGROUND OF THE INVENTION

Field of the Invention

The invention pertains to a novel design for a hinge and fastener which utilizes an interlocking shape, as well as cam surfaces and detents, and does not require additional hardware such as screws or pins, or tools in order to assemble and disassemble the hinge.

Description of the Related Art

A traditional eyeglass hinge is constructed of tenons interlocked by a small screw or rivet. This construction can be difficult to assemble and maintain due to the extraordinarily small size of the parts. Additionally, non-standard screwdrivers must be employed which can be difficult to obtain and use, elsewise, riveted hinges are simply not user serviceable. Despite this, further developments in eyewear hinges have sought out more complex designs, such as spring-loaded hinges. While spring loaded hinges can facilitate deployment of the temple bars, provide a premium feel to eyewear, and guard against breakage due to over-rotation of the temple bars, nevertheless the complexity of such a hinge continues to hinder production times and costs. Additionally, maintenance can be troublesome for users considering that if disassembled, the coil spring typically used in such hinges is easy to lose and difficult to manipulate given its small size.

In the realm of simpler hinge design, efforts have been made to provide hinges that require no hardware or tools, such as friction-welded hinges, but such hinges are permanently fixed and have no elasticity when stressed or over-rotated. Therefore, they are unlikely to be repairable. Therefore, there is a need in the art to provide a hinge which may be assembled and disassembled without tools, is not permanently affixed, and is user serviceable. The present invention achieves these and other goals.

SUMMARY OF THE INVENTION

The present invention is much more than a simple hinge as it can be utilized as a rotatable interlock for virtually any component, whether comprising hard or soft goods such as bags, footwear, skis, or brassieres. To facilitate description and understanding of the present invention, however, the disclosure is directed to one preferred embodiment of the invention as a hinge for eyewear, but it should be understood that the scope of the invention is not limited as such. To describe the invention in simple terms, the hinge includes a "knuckle" or horseshoe-shaped female connector. A male connector is inserted into the female connector, which is then locked into place once the male connector is rotated past protrusions in the opening of the female connector. The hinge is now "interlocked," as the male connector cannot rotate out of the female connector without sufficient force applied to overcome the protrusions.

The hinge is also free to rotate further within the female connector. If no particular orientation of the male and female connector are desired, then the male connector can remain free to rotate within the female connector. However, in such use cases as eyewear, where the invention may be employed as a hinge between the temple bar and the eyewire, it may be desirable to include detents at certain positions, such as fully opened or fully closed. This structure will approximate the "snap" feel provided by spring-loaded hinges, which tend to bias the temple bars in either the fully opened or fully closed positions. In such an event the male connector may include one or more protrusions which approximate cam lobes, while the female connector may have a plurality of indentations to receive the protrusions on the male connector. The protrusions will mate with the indentations in a predetermined orientation to provide an operative disposition for the hinge. The knuckle of the female connector can be designed, and materials can be selected, such that it flexes to provide the appropriate resistive force when a protrusion is rotated out of an indentation. This arrangement provides the biased feel of a spring-loaded hinge without actually requiring a separate coil spring in the assembly.

The inventive design can also create a unique embellishment on fashion and other goods. It also permits the manufacture and construction of a hinge with minimal parts, as well as no moving parts (other than the hinge itself once assembled). This reduces manufacturing time and eliminates the small hardware (such as screws, pins, and springs) which are common in traditional hinge designs. During assembly, the components are quickly interlocked and assembled by hand, without the need for tools, which reduces assembly time of the components. Finally, the exterior shape of the female connector is not constrained to the embodiments shown herein, as it may also be tailored to design preferences, or even to brand logos as may be common with hinges and fasteners on fashion items.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
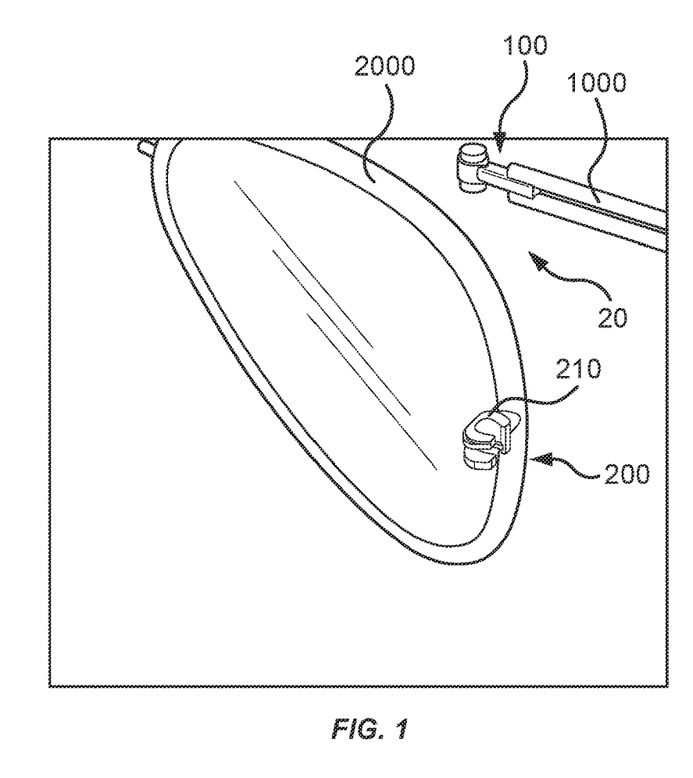
FIG. 1 is a perspective view of a male connector attached to a temple bar and a female connector attached to an eye wire, where the male and female connector are in a disengaged disposition.
Figure 2:
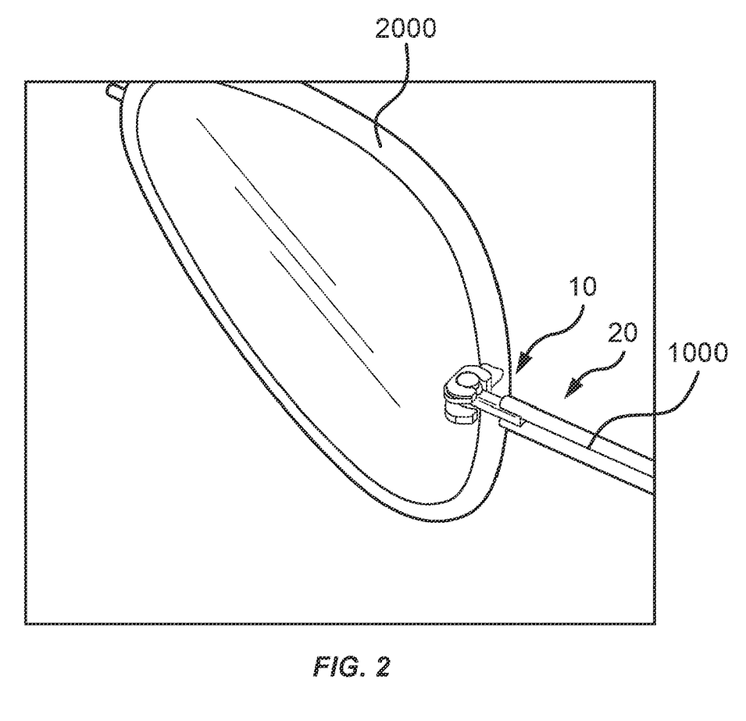
FIG. 2 is a perspective view of the embodiment of FIG. 1 where the male connector has been located within the female connector but is still in a disengaged disposition.
Figure 3:
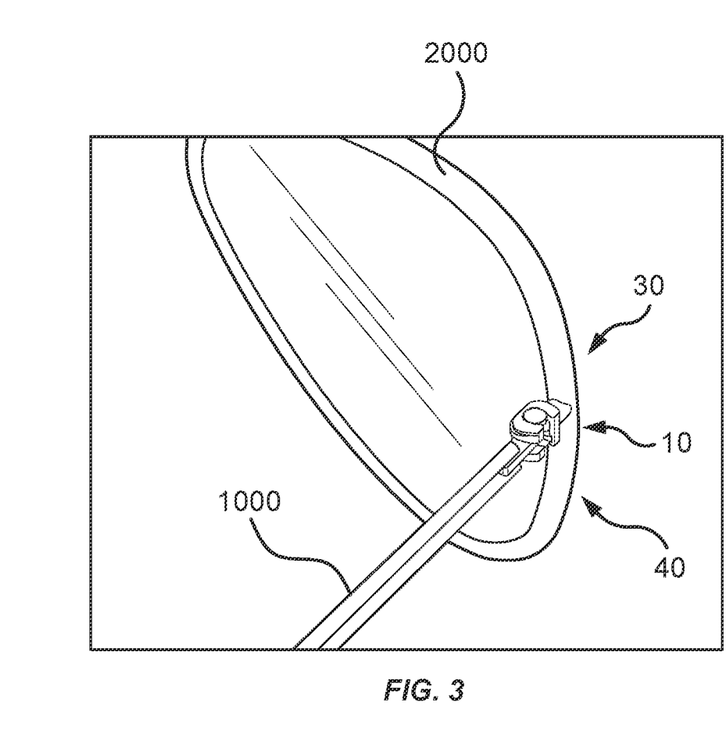
FIG. 3 is a perspective view of the embodiment of FIG. 1 where the male connector has been rotated into an interlocked disposition as well as into a first orientation.

With reference to FIGS. 1-4 the steps of assembling and using the inventive hinge 10 to connect a temple bar 1000 to an eyewear frame 2000 are depicted. FIGS. 1 and 2 depict the male connector 100 and female connector 200 in a disengaged disposition 20. First the male connector 100 is inserted within the female connector 200. Notably, in FIG. 2 the hinge is defined to be in a disengaged disposition 20 because the male connector 100 is not yet releasably retained by the female connector 200. As will be discussed in further detail below, it is only when the male connector 100 is rotated a predetermined amount (ninety degrees as shown in FIG. 3) that the hinge 10 is considered to be in an interlocked disposition 30. The operative structuring of the hinge 10 does not permit the male connector 100 to be rotated back out of an interlocked disposition 30 unless a predetermined amount of force is applied, which, in a preferred embodiment, would exceed the force anticipated to be applied during regular use of the hinge 10.

Figure 4:
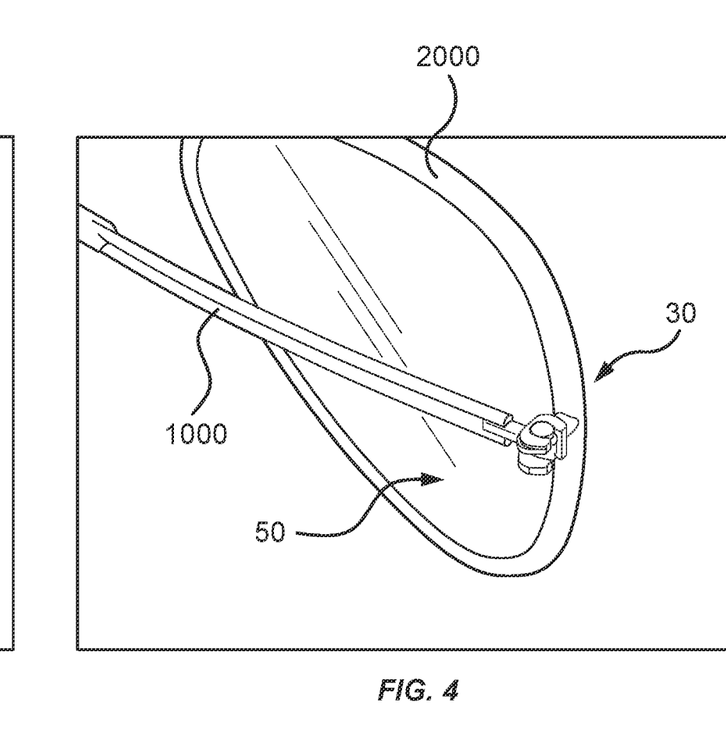
FIG. 4 is a perspective view of the embodiment of FIG. 1 where the male connector has been rotated further into a second orientation.

FIGS. 3 and 4 also show that a plurality of fixed orientations may be accommodated by the hinge 10, such as, in the case of eyewear, a fully open first orientation 40 for wearing the glasses, and a fully closed second orientation 50 for compact storage of the glasses. In a preferred embodiment, operative structuring on the male 100 and female 200 connectors provide detents to hold the temple bars at these predetermined orientations in order to facilitate use and approximate a "snap" or "spring" hinge feel common in more complicated and more expensive hinge designs.

With respect to the remaining figures, the designs shown in this application are symmetrical about at least one axis in a "mirror image" arrangement. It will be appreciated that this aspect is not necessary to the basic operation of the invention but can provide additional or enhanced functionality when desired.

Figure 5:
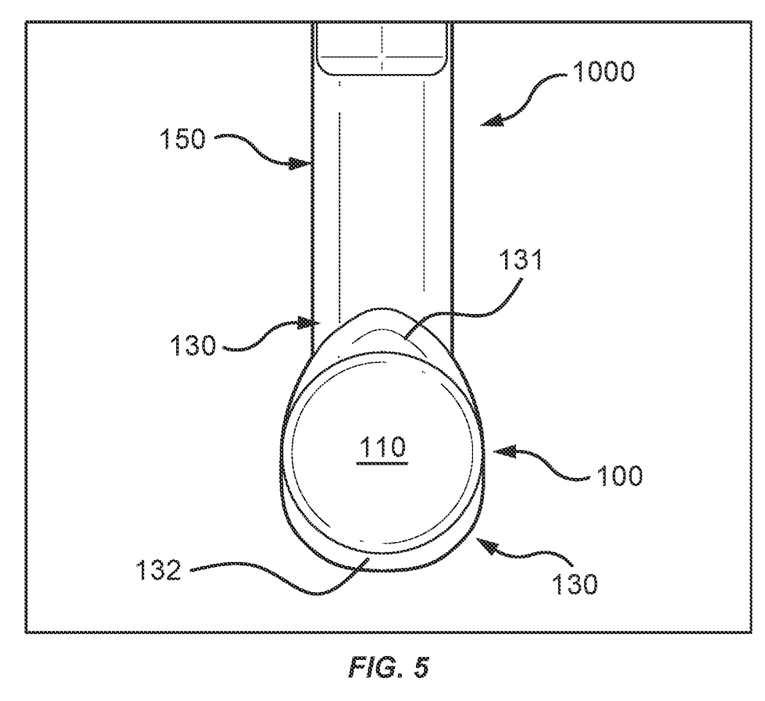
FIG. 5 is a top view of a male connector in accordance with one embodiment of the present invention.
Figure 6:
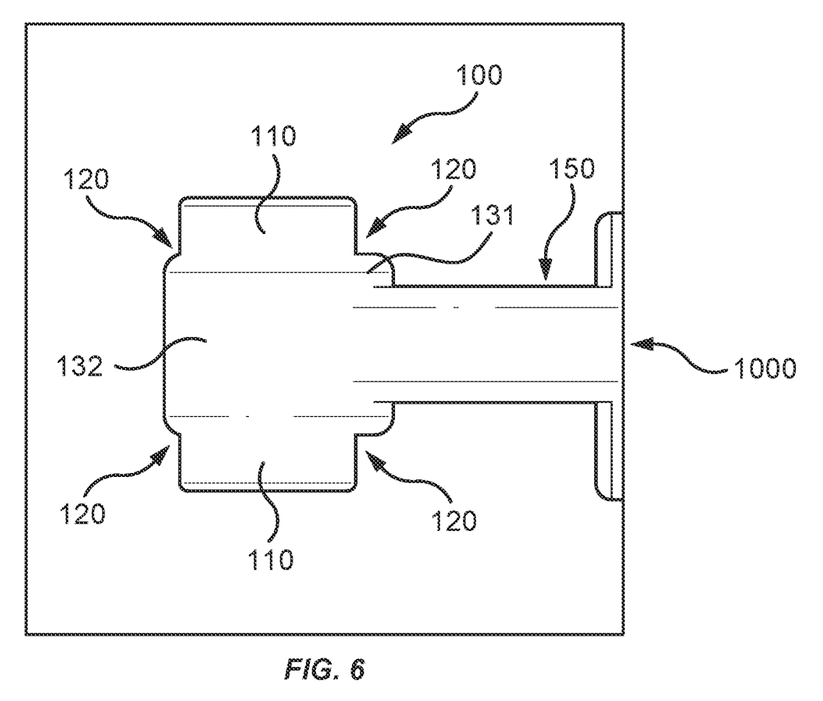
FIG. 6 is a side view of a male connector in accordance with one embodiment of the present invention.
Figure 7:
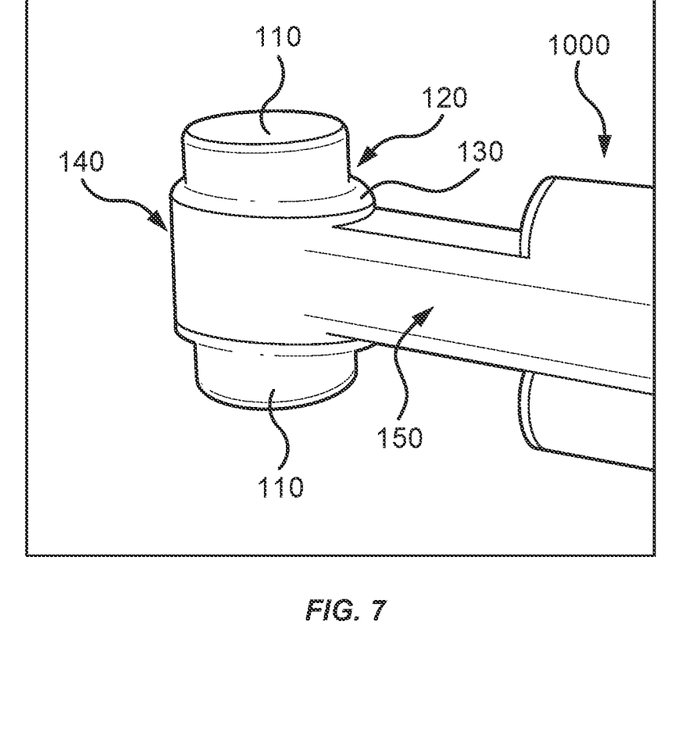
FIG. 7 is a perspective view of a male connector in accordance with one embodiment of the present invention.

Turning to FIGS. 5-7, one embodiment of the male connector 100 is shown. The male connector includes a pin 110 which primarily guides and aligns the male connector 100 within the female connector 200 and also provides a main shaft or axis about which the male connector 100 may rotate within the female connector 200. The male connector 100 also includes an arm 150 protruding therefrom which, in certain embodiments, facilitates the interlocking of the male connector 100 to the female connector 200, as well as serves as an anchor point for attachment of the desired structure, which in the depicted embodiment is the temple bar 1000 of eyewear.

In the depicted embodiment, the male connector 100 also includes a shoulder 120 running circumferentially around the pin 110 at a lower level than the pin 110, or inwardly of the pin 110 when describing a symmetrical embodiment. Stated otherwise, the pin 110 may be considered to protrude upwardly or outwardly from the shoulder 120. However, it should be noted that the shoulder 120 is not, per se, necessary for the operation of the inventive hinge 10 nor is it required to run circumferentially about the pin 110. In the depicted embodiment the shoulder 120 forms a plurality of lobes 130. More specifically, the lobes 130 may include a nose 131 as well as a heel 132. In the depicted and preferred embodiments, the nose 131 protrudes further away from the pin 110 than the heel 132, and has a steeper slope, contributing to a relatively rounded, triangular shape. The heel 132, on the other hand, is characterized by a flatter curvature along its main portion.

Figure 8:
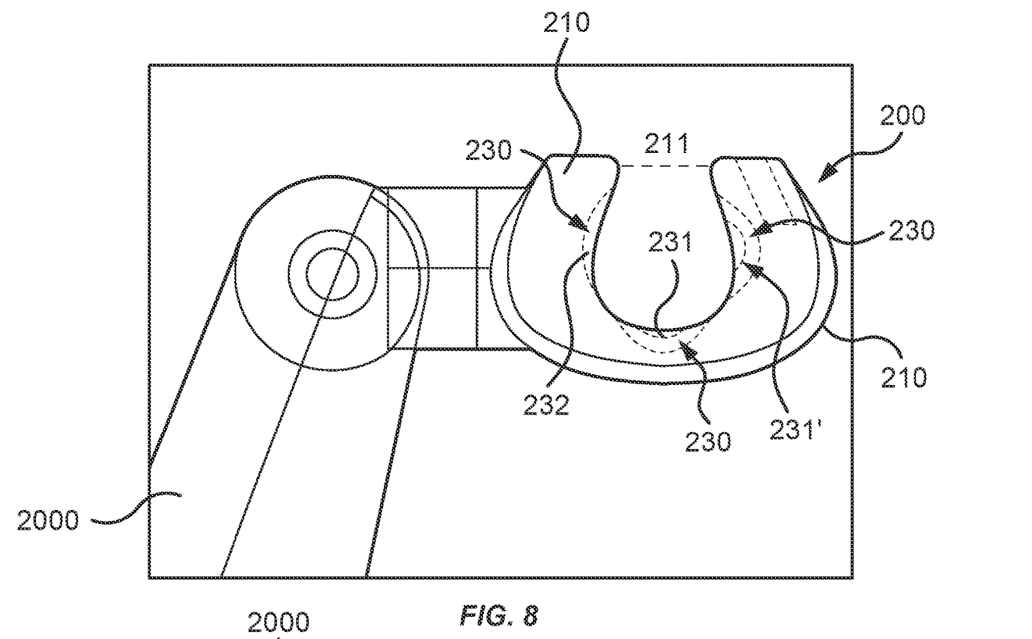
FIG. 8 is a top view of a female connector in accordance with one embodiment of the present invention which is depicted as transparent in order to facilitate disclosure of interior surfaces.
Figure 9:
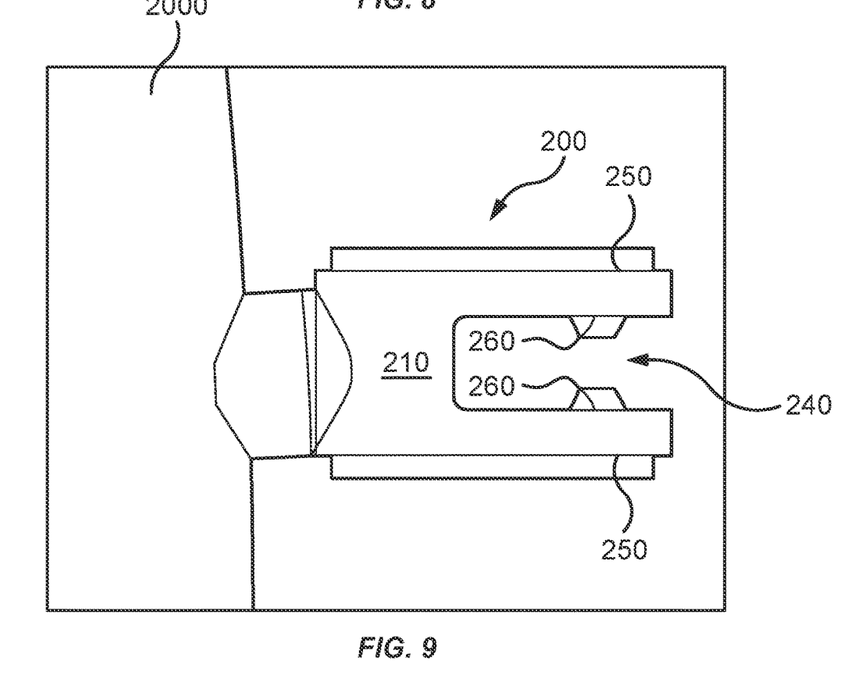
FIG. 9 is a side view of a female connector in accordance with one embodiment of the present invention which is depicted as transparent in order to facilitate disclosure of interior surfaces.
Figure 10:
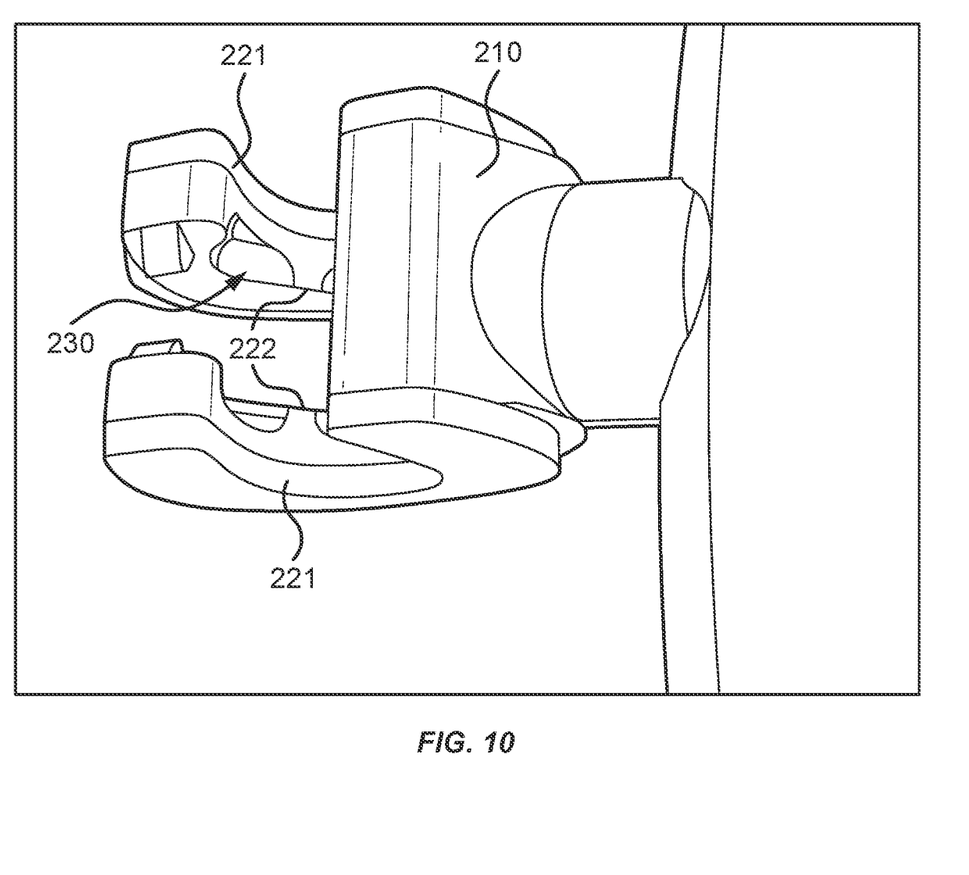
FIG. 10 is a perspective view of a female connector in accordance with one embodiment of the present invention which is depicted as transparent in order to facilitate disclosure of interior surfaces.

Turning now to FIGS. 8-10, one embodiment of a female connector 200 is depicted therein. The main structure of the female connector 200 is the knuckle 210 which includes an open end 211 and an interior profile 220. The interior profile also includes an outer portion 221 and an inner portion 222 (although these may be characterized as upper and lower portions for non-symmetrical designs). The outer portion 221 follows the curvature of the interior profile 220. However, the inner portion 222 may include one or more indentations 230 which can be of varying dimensions. As depicted, the indentations include two nose indentations 231 and one heel indentation 232.

The knuckle 210 may also include a channel 240 running along one side thereof. The primary purpose of the channel 240 is to accommodate rotation of the arm 150 from the male connector 100, as will be described in further detail. However, certain embodiments may not require a channel 240 at all. In the depicted embodiment, because the channel 240 extends from the exterior of the knuckle 210 through to the interior profile 220, as well as along the side of the knuckle to the open end 211, it creates two cantilevered fingers 250. Therefore, as represented in FIG. 9, the channel 240 extends between and along a length of the two cantilevered fingers 250. Each finger 250 includes a retention tooth 260 projecting therefrom. In the depicted embodiment the retention teeth 260 include a symmetrical, sloped configuration, but in other embodiments, the teeth 260 may include an asymmetrical or other shape, particularly as may facilitate assembly but discourage disassembly of the hinge 10.

Having described the relevant structural features, reference can now be had to all of the drawings generally for discussion on the interoperability of the relevant components. As mentioned above, the hinge 10 may be assembled by first beginning with a disengaged disposition 20 of the male connector 100 and female connector 200. Once the pin 110 is aligned within the knuckle 210, the arm 150 may be rotated into the channel 240. In a preferred embodiment, the retention teeth 260 form an interference fit with the arm 150 by extending into the channel to form a gap that is smaller than the thickness of the arm 150. Therefore, the arm 150 may only be rotated past the retention teeth 260 by applying sufficient force to separate the retention teeth 260 via spring action of the cantilevered fingers 250. As can be seen in the depicted embodiments, the sloped configuration of the retention teeth 260 will transform the rotational force applied to the arm 150 into a separating force driving the fingers 250 apart, thereby allowing the arm 150 to pass between the retention teeth 260 and into an interlocked disposition 30. It will be appreciated that the hinge 10 now will not be disengaged unless sufficient force is applied to the arm 150. In other embodiments, the retention teeth 260 may include a steeper slope on one side so as to require more force to disassemble the hinge 10. Appropriate material selection and design may be employed to provide a desired stiffness measure of the fingers 250 to achieve the desired amount of force required to be applied to the arm 150 in order to separate the fingers 250. Additionally, the retention teeth 260 are located on distal ends of the fingers 250, such that the arm 150 can rotate substantially along the full length of the channel, maximizing useable rotation of the hinge 10. The retention teeth 260, however, will obstruct the arm 150 and prevent it from rotating past a predetermined point, unless sufficient force is applied to the arm 150.

It can now be appreciated that the design of the present invention facilitates a tool-less assembly and disassembly of the hinge and, additionally, provides similar benefits as a traditional spring hinge in terms of its capability of accommodating over-rotation of the temple bars. Even if excessive force were to be applied, the male connector 100 will simply rotate into a disengaged disposition 20, rather than break. The user can simply re-engage the male connector 100 to continue use.

Once in an interlocked disposition 30, the article may be freely used without concern for the hinge 10 coming undone on its own accord. In the depicted embodiment, as an eyeglass hinge, the operative structuring of the hinge 10 includes detents to help hold the temple bars 1000 in discrete orientations including a first orientation 40 and a second orientation 50, and any other number of orientations as may be desired. This is facilitated by the interaction of the lobes 130 and the indentations 230, and due to the relative circumference of the interior profile and the pin 110. More specifically, in a preferred embodiment, the pin 110 may be dimensioned to rotate freely within the interior profile, but the shoulder 120 and lobes 130 should be dimensioned for an interference fit unless nestled within one of the indentations 230. Appropriate material selection and design can be employed to provide a desired stiffness measure of the knuckle 210 to achieve the desired amount of force required to rotate the lobes 130 out of a given indentation 230. When in a first orientation 40, a first or nose lobe 131 will tend to rest within a first nose indentation 231' (denoted as 231' to distinguish from other nose indentations), while the heel lobe 132 will tend to rest within a second or heel indentation 232. When in a second orientation 50, the nose 131 will tend to rest within a third or other nose indentation 231 while the heel lobe 132 will tend to rest in the open end 211 of the knuckle 210. It should also be appreciated that the lobes 130 and indentations 230 may be switched such that the lobes 130 are formed on the female connector 200 and the indentations 230 are formed on the male connector 100. Such an arrangement is not considered to depart from the spirit and scope of the invention and would be considered equally operable as the embodiment depicted in the figures.

Because of the interference fit between the shoulder 120 and the interior profile 220, when moving the male connector 100 out of one orientation, a user will feel some amount of resistance, and possibly even a "snap" depending on the design, due to the camming action of the lobes 130 against the indentations 230. When reaching another orientation, the male connector 100 may "snap" into alignment as the lobes 130 find other indentations 230 in which to rest, and the knuckle 210 relaxes. This aspect of the design provides the user with a more premium feel that has heretofore only been achieved with complicated mechanism, such as coil springs.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:
1. A hinge comprising:
a male connector including a pin having a plurality of lobes extending outwardly therefrom and an arm; said arm connected to said pin and extending outwardly therefrom,
a female connector including a knuckle with an interior profile; said interior profile comprising a plurality of indentations formed therein,
said knuckle including two fingers disposed in spaced relation to one another along correspondingly disposed lengths thereof,
a channel disposed between said two fingers and extending along said corresponding lengths thereof; said channel at least partially defined by said spaced relation between said two fingers,
at least one retention tooth disposed on a distal end of one of said two fingers and extending into said channel towards a distal end of the other of said two fingers,
said arm and said at least one retention tooth being correspondingly dimensioned and configured to provide an interference fit therebetween concurrent to said arm being rotated into and out of said channel,
each of said plurality of lobes movable with said pin into and out of nesting engagement with at least one indentation of said plurality of indentations to define a plurality of detent positions; each of said plurality of detent positions establishing one of a plurality of discrete orientations of said arm relative to said knuckle,
said male and female connector being operatively dimensioned and configured to be disposed between an interlocked disposition and a disengaged disposition; and
said interlocked disposition comprising said pin being disposed within said knuckle and said arm being movably disposed within said channel.

2. The hinge as recited in claim 1 wherein said disengaged disposition is at least partially defined by said arm being disposed outside of said channel.

3. The hinge as recited in claim 1 wherein said male connector and said female connector are selectively disposable in a first orientation and a second orientation; said first orientation comprising a first of said plurality of lobes disposed within a first of said plurality of indentations, concurrent to a second of said plurality of lobes disposed within a second of said plurality of indentations.

4. The hinge as recited in claim 1 wherein said knuckle further comprises an open end, said channel extending, between said two fingers, from said open end along one side of said female connector.

5. The hinge as recited in claim 4 wherein said arm comprises an elongated configuration having a length thereof extending transversely outward from said pin, said arm dimensioned to rotate, relative to said female connector, within and along a length of said channel.

6. The hinge as recited in claim 1 further comprising a plurality of at least two retention teeth each mounted on a distal end of a different one of said two fingers and extending outwardly therefrom into said channel; said retention teeth being dimensioned and configured to at least partially obstruct said arm from rotating past a predetermined point within said channel.

7. The hinge as recited in claim 6 wherein said at least two retention teeth are located adjacent an open end of said knuckle and a distal end of said channel.

8. The hinge as recited in claim 6 wherein said plurality of retention teeth each comprise an at least partially sloped configuration.

9. A hinge comprising:
   a male connector having an arm connected to a pin, said pin having a plurality of lobes protruding therefrom;
   a female connector comprising a knuckle including two fingers disposed in spaced relation to one another along correspondingly disposed lengths thereof;
   a channel disposed between said two fingers and extending along said corresponding lengths thereof; said channel at least partially defined by said spaced relation between said two fingers,
   an interior profile extending along each of said two fingers and including a plurality of indentations formed in said two fingers,
   each of said plurality of lobes movable with said pin into and out of nesting engagement with at least one indentation of said plurality of indentations to define a plurality of detent positions; each of said plurality of detent positions establishing one of a plurality of discrete orientations of said arm relative to said knuckle,
   said male connector and said female connector selectively disposable in a first orientation and a second orientation;
   said first orientation comprising a first of said plurality of lobes disposed within a first of said plurality of indentations, concurrent to a second of said plurality of lobes disposed within a second of said plurality of indentations, and
   said second orientation comprises said first lobe disposed within a third of said plurality of indentations, concurrent to said second lobe disposed within an open end of said knuckle.

10. The hinge as recited in claim 9 further comprising a plurality of at least two retention teeth each mounted on a distal end of a different one of said two fingers and extending outwardly therefrom into said channel; said retention teeth being dimensioned and configured to at least partially obstruct said arm from rotating into and out of said channel.

11. The hinge as recited in claim 10 wherein said at least two retention teeth are disposed within said channel in aligned, substantially facing relation to one another.

\* \* \* \* \*